UNITED STATES PATENT OFFICE.

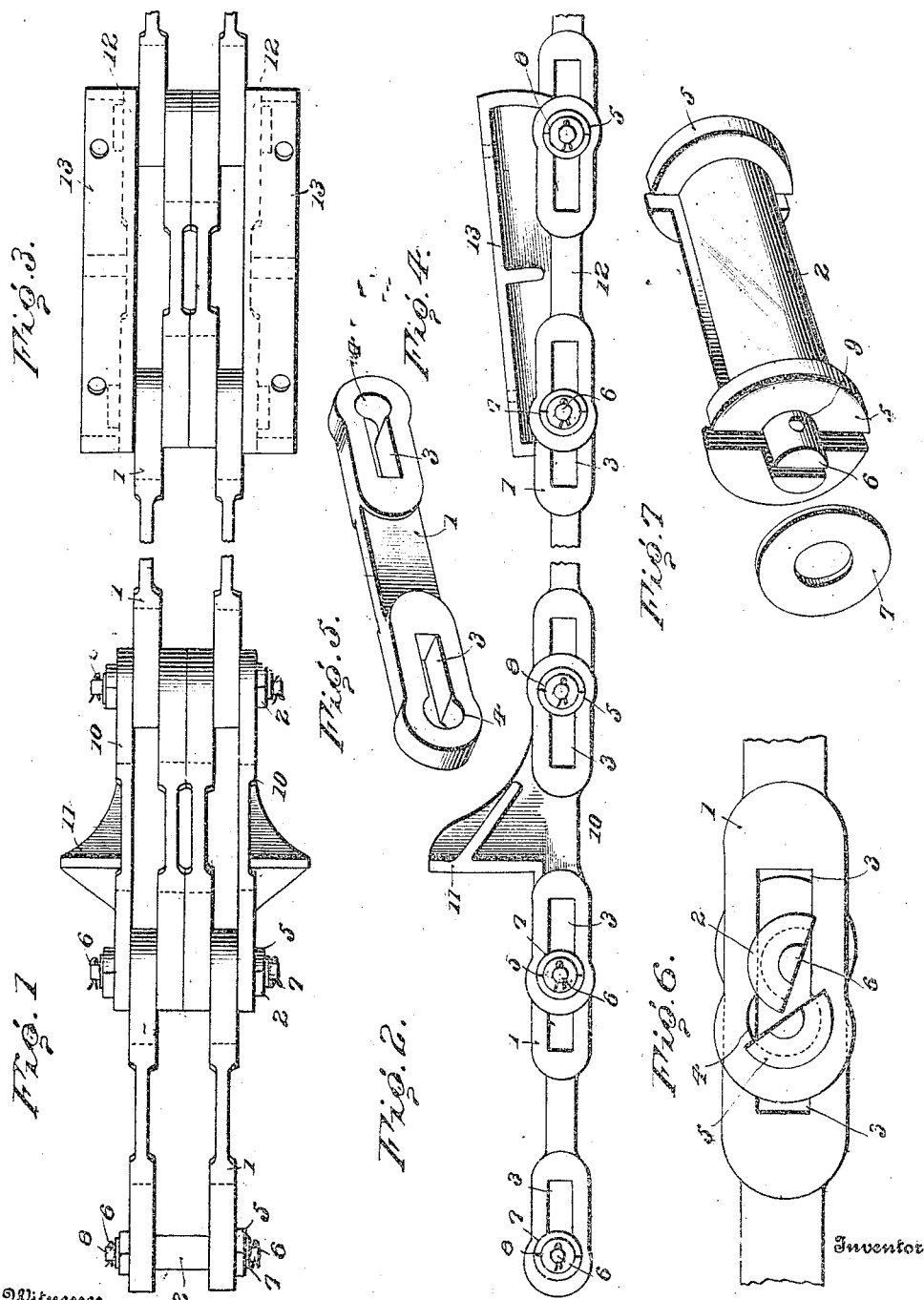

JOHN F. WAGNER, OF TAMAQUA, PENNSYLVANIA.

CHAIN.

No. 886,904.  Specification of Letters Patent.  Patented May 5, 1908.

Application filed January 18, 1908. Serial No. 411,492.

*To all whom it may concern:*

Be it known that I, JOHN F. WAGNER, citizen of the United States, residing at Tamaqua, in the county of Schuylkill and State of Pennsylvania, have invented certain new and useful Improvements in Chains, of which the following is a specification.

This invention appertains to chains which are adapted to be readily lengthened or shortened, either by the addition of links thereto or by the removal of one or more of the links.

The purpose of the invention is to provide connection which will prevent the accidental separation of the links in the event of slack being produced in the chain and also to provide for separation of the links by a minimum relative movement thereof.

Chains of the type herein aforesaid are generally provided with slots having a portion of the slots enlarged and pins adapted to be passed through the enlarged portions of the slots and retained in place either by moving the links apart to throw the enlarged portions of the slots out of register or by the relative turning of the links and connecting pins. The former construction admits of the links separating when relatively moved one upon the other and the latter requires a great amount of slack in the chain in order to admit of the connecting pins either being removed or placed in position.

In accordance with this invention, the links are provided with slots and the outer end portions of said slots are enlarged, and the connecting pins are split longitudinally to form sections, each section being adapted to be passed through the registering slots of adjacent links and the sections being adapted to be brought together in the enlarged openings and filling the same so as to prevent longitudinal play of one link upon the other. The connecting pins are provided at opposite ends with heads or flanges which engage with the outer sides of the links and prevent displacement of the pins.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a top plan view of a portion of a chain embodying the invention, and showing the same adapted for use as an elevator. Fig. 2 is a side view of the parts shown in Fig. 1. Fig. 3 is a view similar to Fig. 1, showing the chain adapted for use as a conveyer. Fig. 4 is a side view of the parts shown in Fig. 3. Fig. 5 is a detail perspective view of a link of the chain. Fig. 6 is a side view of the ends of adjacent links, showing the sections of the connecting pin separated. Fig. 7 is a detail perspective view of a connecting pin and a washer for positively connecting the sections thereof.

Corresponding and like parts are referred to in the following description and indicated in all the views of the drawings by the same reference characters.

The chain is formed of a series of links 1 of like formation and arranged with the ends of adjacent links overlapped and connected by means of pins 2 passed through slots or openings formed in said links. The links may be of any construction, size and formation depending upon the design and particular use for which intended. A longitudinal slot 3 is provided in each end of a link, and the outer end of each slot is enlarged, as shown at 4, to receive the connecting pin 2, which is of larger diameter than the width of the slot 3. The connecting pins are provided with heads or outer flanges 5, which overlap the openings 4 and prevent longitudinal displacement of the pins when in position, said pins in turn preventing relative longitudinal movement of the links by reason of the snug fit of the pins in the enlarged portions 4 of the slots 3. The pins are slit longitudinally or formed of halves or sections, thereby admitting of each section being readily passed through registering slots in the overlapped ends of adjacent links, the sections being brought together so as to fit the enlarged openings 4, this being accomplished by moving the links apart and at the same time arranging the sections of the pin so that one section will slide upon the other, as indicated most clearly in Fig. 6. After the sections have been united and caused to fit the openings 4 of adjacent links, the latter are prevented from longitudinal movement by turning the links to throw the meeting faces or joint at any angle other than that shown in Fig. 6.

In order to prevent casual displacement of the sections or parts of the connecting pins, the latter are formed at opposite ends with projections 6 which are adapted to receive washers 7, the latter being held in place by means of cotter pins 8 passed through openings 9 formed in the sections or parts of the projections 6. It is to be understood that the sections of a connecting pin separate and come together by a sliding movement, and in some instances the cotter pins, alone, may suffice to prevent separation of the sections, but to prevent any shearing action of the cotter pins by the tendency of the sections of the connecting pins to move, washers 7 are employed, the cotter pins retaining the washers in place.

The invention may be applied to drive chains for transmitting motion from one part to another, or to chains used for elevators or for conveyers, or for chains of any variety which are adapted to be lengthened or shortened for any purpose. As shown in Figs. 1 and 2, links 10 are employed in addition to the links 1 and are provided with bracket lugs 11 for attachment thereto of flights or buckets. In the construction shown in Figs. 3 and 4, links 12 are employed and provided with flanges 13 to receive lags, bars or the like commonly employed in endless conveyers or carriers.

Having thus described the invention, what is claimed as new is:

1. A separable chain comprising links having openings, and connecting pins provided at opposite ends with heads or flanges and each pin formed of longitudinal parts or sections which are adapted to be passed endwise through the openings of the links and assembled therein and prevented from displacement by the heads thereof and in turn preventing longitudinal play of the links one upon the other.

2. A separable chain composed of links, said links having longitudinal slots which are enlarged at their outer ends, and connecting pins for coupling the links in series, each connecting pin having a head at opposite ends and composed of longitudinal sections or parts, which are adapted to be slipped endwise through the slots of the links and assembled therein to fill the outer enlarged ends of said slots.

3. A separable chain composed of links, said links having longitudinal slots which are enlarged at their outer ends, connecting pins for coupling the links in series, each connecting pin having a head at opposite ends and composed of longitudinal sections or parts, which are adapted to be slipped endwise through the slots of the links and assembled therein to fill the outer enlarged ends of said slots, and means for positively connecting the sections or parts of the connecting pins to prevent accidental separation thereof.

4. In a separable chain, the combination of links provided with slots having enlarged portions, connecting pins having heads at their ends and composed of longitudinal sections or parts, and having terminal projections, said sections or parts of the connecting pins being adapted to be passed through slots of the links and assembled in the enlarged portions of said slots, and means fitted to the terminal projections of the pins to hold the sections thereof against actual displacement.

5. In a separable chain, the combination of links provided with slots having enlarged portions, connecting pins having heads at their ends and composed of longitudinal sections or parts, and having terminal projections, said sections or parts of the connecting pins being adapted to be passed through slots of the links and assembled in the enlarged portions of said slots, and washers slipped upon the said terminal projections of the pins to prevent actual separation thereof.

6. In a separable chain, the combination of links provided with slots having enlarged portions, connecting pins having heads at their ends and composed of longitudinal sections or parts, and having terminal projections, said sections or parts of the connecting pins being adapted to be passed through slots of the links and assembled in the enlarged portions of said slots, washers slipped upon the said terminal projections of the pins to prevent actual separation thereof, and cotter pins passed through openings in the parts of the terminal projections to retain the washers in place.

In testimony whereof I affix my signature in presence of two witnesses.

JOHN F. WAGNER. [L. S.]

Witnesses:
HARRY GOULD,
SAMUEL R. BEARD.